June 11, 1957   J. A. WALKER   2,795,067
DISPLAY DEVICE FOR VIEWING TRANSPARENCIES
Filed July 28, 1954   2 Sheets-Sheet 1
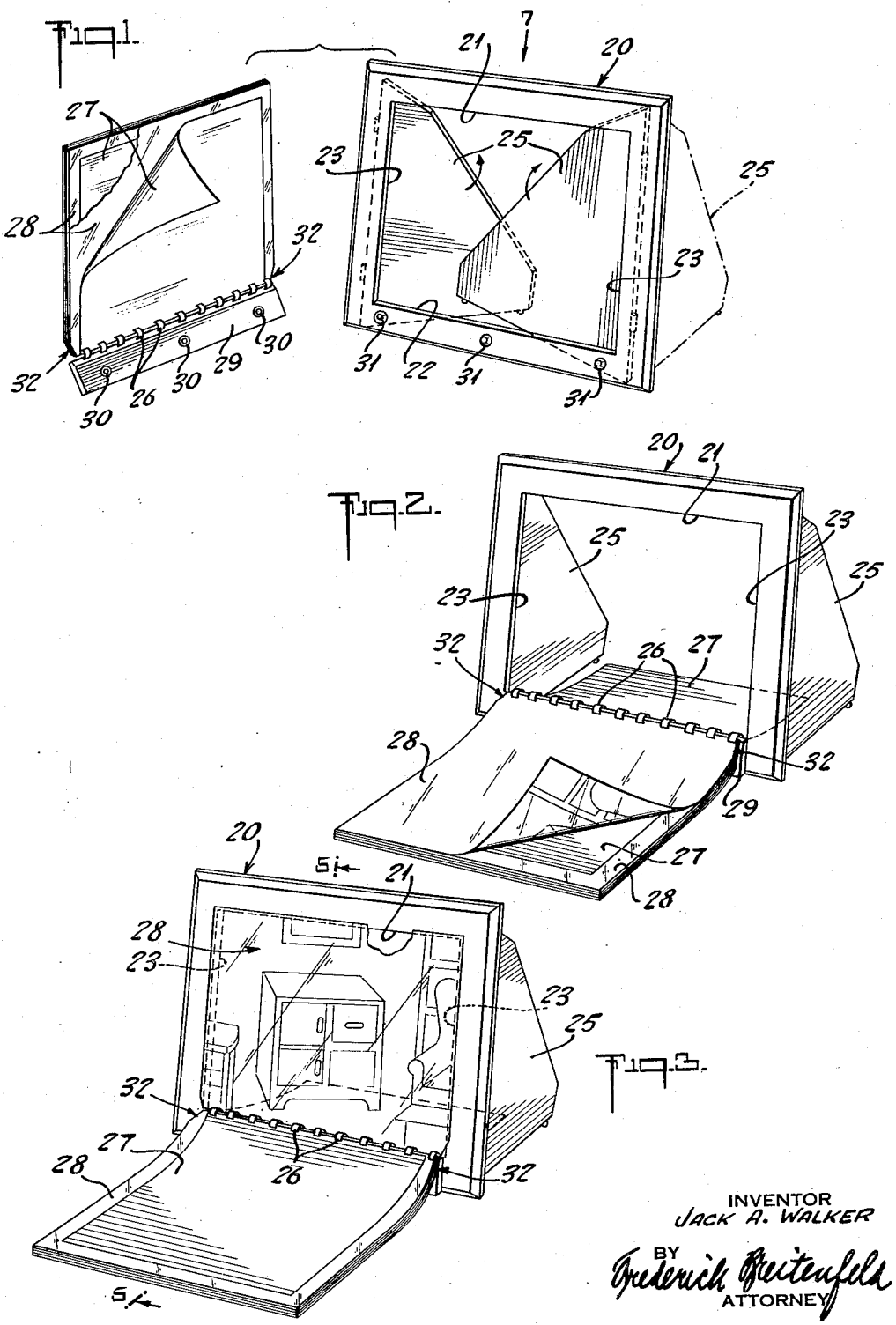
INVENTOR
JACK A. WALKER June 11, 1957　　　J. A. WALKER　　　2,795,067
DISPLAY DEVICE FOR VIEWING TRANSPARENCIES
Filed July 28, 1954　　　　　　　　2 Sheets-Sheet 2
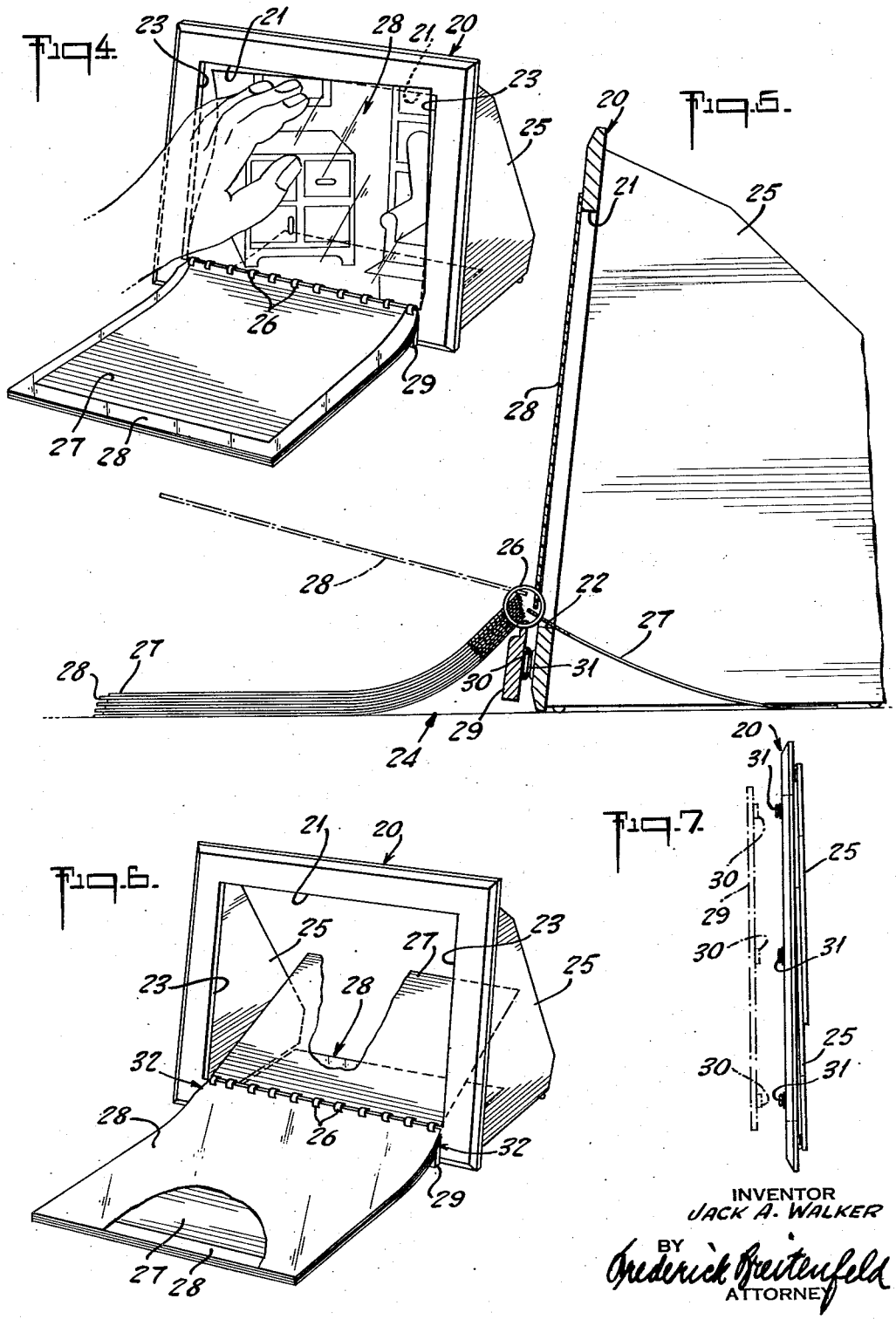
INVENTOR
JACK A. WALKER
BY
Frederick Breitenfeld
ATTORNEY

United States Patent Office 2,795,067
Patented June 11, 1957

2,795,067
DISPLAY DEVICE FOR VIEWING TRANSPARENCIES

Jack A. Walker, New York, N. Y., assignor to Fairhaven Properties Corp., a corporation of Delaware Application July 28, 1954, Serial No. 446,332

7 Claims. (Cl. 40—102)

My present invention relates generally to display devices, and has particular reference to the successive display of a series of transparencies intended to be illuminated by light passing through them from the rear.

It is the general object of the invention to provide a portable unit, in the nature of a portfolio, which includes an open frame readily supportable in an upstanding position, and an associated stack of transparent display elements that can be readily brought successively into a display position spanning the opening in the frame. The device can be used for many different display purposes, and is admirably suited for use by salesmen.

A particular feature of the improved construction lies in the speed and simplicity with which the user can bring the successive display cards into the "framed" display position, and then at the desired moment move them from the position to an inoperative position. In attaining this desirable result, the display leaves are arranged in the form of a stack, the stack being hinged to the frame on its front face, and the display leaves being in hinged relation to one another. The employment of the device involves a swinging of each display leaf into an upstanding position in centered relation to the frame, and a subsequent movement of the leaf rearwardly into an inoperative position behind the frame.

It is a particular feature of the invention to construct each display leaf of a size just slightly larger than the frame opening so that it comes readily to a position of rest in a display position on the front face of the frame and in centered relation, the display leaf being sufficiently stiff to remain in an upstanding position, but sufficiently flexible so that pressure upon the leaf in a rearward direction will push it bodily through the frame opening and allow it to fall into an inoperative position behind the frame.

Other features of the invention reside in the provision of special light-reflective sheets between successive display leaves, in a removable arrangement of the display stack or pad with respect to the frame, and in the construction and arrangement of parts which make the device as a whole easy and inexpensive to manufacture, and simple to set up for use and to restore to a collapsed position for purposes of transportation.

I achieve the foregoing objectives and advantages, and such other advantages as may hereinafter appear or be pointed out, in the manner illustratively exemplified in the accompanying drawings, in which—

Figure 1 is an exploded view of the frame part of the device (at the right), and the assembly of stacked sheets to be separably asociated with it (at the left);

Figure 2 is a perspective view of the device in readiness for the display of the first transparency;

Figure 3 is a view similar to Figure 2, showing the first transparency in display position;

Figure 4 is a view similar to Figure 3 showing the manner in which the display leaf is pushed rearwardly into an inoperative position;

Figure 5 is a cross-sectional view substantially along the line 5—5 of Figure 3;

Figure 6 is a view similar to Figure 4 showing a step preliminary to the display of a succeeding transparency; and Figure 7 is an edge view of the frame part of the device, substantially in the direction of the arrow 7 of Figure 1.

The frame part of the device may be composed of any suitable or desired relatively stiff material, such as wood, metal, or cardboard. I have shown the frame 20 of substantially rectangular shape, with a rectangular opening defined by parallel upper and lower edges 21 and 22, and parallel side edges 23.

The frame is adapted to be readily supported in a substantially upstanding position, slanted slightly rearwardly. In the embodiment of the invention illustrated in the drawings, the frame is adapted to be set up on a suitable substantially horizontal supporting surface 24 (see Figure 5), and is provided with a pair of opposed spaced wings 25 extending rearwardly from the frame on opposite sides of the frame opening. The wings can be hinged in any suitable fashion to the side panels of the frame, to permit them to be moved between the collapsed relationship shown in Figure 7 and Figure 1, and the rearwardly extending frame-propping positions shown in the other figures. The front faces of the wings 25, i. e., the surfaces which are directed toward each other when the frame is set up, are purposely made of high light-reflective properties.

Hingedly held together by a ring binder 26 is a stack of sheets consisting of alternate sheets 27 of predetermined uniform size, and an alternate set of transparencies 28 of a uniform size slightly larger. The entire bundle is removably applicable to the front of the frame to bring the axis of the hinge binder 26 into substantial alignment with the lower horizontal edge 22 of the frame. In the preferred construction illustrated this is achieved by hingedly securing the binder 26 to a strip or backing member 29 provided with separable fasteners 30, the latter being adapted to cooperate with a complementary set 31 arranged on the front face of the frame adjacent to the lower edge 22 of the frame opening.

The hinged stack of leaves is shown separated from the frame in Figure 1, and in Figure 7 I have shown in dotted lines how the backing member 29 is brought into parallel relation to the frame, whereupon the complementary fasteners 30, 31 may be engaged to hold the parts in the secure relationship shown in the other figures.

In setting up the device on a suitable supporting surface, the wings 25 are swung rearwardly. They are purposely constructed in such a way that they will serve to support the frame in the upright position shown, slanted slightly rearwardly as best indicated in Figure 5. The hinged bundle of sheets assumes a position of rest forwardly of the frame. The first step in using the device is to pick up the topmost sheet 27 and swing it rearwardly into the position shown in Figure 2. The sheet 27 (as well as all the other sheets 27) is of a size which permits it to swing freely and in an unobstructed manner rearwardly through the frame opening. When the sheet 27 comes to rest in its rearward disposition its top surface, along with the mutually-facing surfaces of the wings 25, reflects light from above (either natural or artificial) in a generally forward direction. To enhance this operation, the front face of each of the sheets 27 is purposely made of high light-reflective character.

The device is now ready for the display of the first transparency. This involves nothing more than picking up the uppermost sheet 28 (Figure 2) and swinging it upwardly and rearwardly. The sheet 28 (and all other sheets 28) is purposely of a size slightly larger than that of the frame opening, as a result of which the sheet 28 comes to rest in the position shown in Figures 3 and 5. The pictorial or photographic embellishment on the display sheet is of light-permeable character, and the light reflected forwardly through the frame opening as hereinbefore described serves to illuminate the display sheet 28 in a highly effective manner.

If desired, the rear face of the following sheet 27 (the one shown in full lines in Figure 3) may be imprinted with data or other information having a relationship to the subject of the display leaf on view.

After the viewing of the sheet 28 has been completed, the pressure of a hand rearwardly upon it, as indicated in Figure 4, is sufficient to push it bodily through the frame opening, whereupon it falls into the inoperative position behind the frame. The ability to do this arises from the fact that each of the display transparencies is made of a material which is sufficiently rigid and self-sustaining to remain in the upright display position (Figure 5) yet sufficiently flexible to permit the slight distortion that is needed to push it bodily through the frame opening. Plastic sheets of the "vinyl" type are well-suited for the purpose, embodying not only the requisite form-retaining quality and body, but also adequate flexibility and toughness. Such sheets are resistant to handling and to wear and tear, and they lend themselves admirably to lithographing and other printing processes. The thickness of the sheet should be chosen, in relation to the size of the frame opening against which it is to rest, that the rigidity, transparency, and flexibility desired will be attained.

In bringing each succeeding display element into display position, the procedure is repeated. That is, the uppermost sheet 27 is first swung rearwardly through the frame opening, and the next adjacent transparency is then swung upwardly, automatically coming to rest in the display position of Figure 5 because of its slight oversize dimensions. To facilitate the pushing-through of each of the oversize display leaves, as shown in Figure 4, each of the sheets 28 may be slightly reduced in its lateral dimension in the region directly adjacent to the ring binder 26, as indicated at 32.

The procedure described is facilitated by making each of the intermediate relatively opaque sheets slightly smaller in size than the frame opening, as hereinbefore described and as depicted in the drawings. In this way, the step of shifting each of these light-reflective sheets from the front of the frame to the back is relatively simple and quick. It will be understood, however, that the advantageous features of the device as a whole would still be retained even if the intermediate sheets were of the same slightly oversized dimensions (relative to the frame opening) as the light-permeable display leaves. Under certain circumstances it may be desirable to make all the sheets of the stack, i. e., both the light-permeable leaves and the intermediate sheets, of the same size, requiring that each be deliberately pushed rearwardly, through the frame, with a corresponding momentary distortion or deflection at the edges.

After all the sheets of the bundled stack have been displayed, the parts can be readily restored to their initial relationship by disconnecting the fasteners 30, 31, moving the backing element 29 bodily through the frame opening, and bringing the entire bundle to the front of the frame, then re-connecting the fasteners 30, 31.

Obviously, holding devices other than snap fasteners (30, 31) may be employed to retain the backing element 29 in removable manner in anchored relation to the front of the frame. For example, it may be sufficient for the purpose that the backing element 29 be removably engaged within a special pocket provided on the front of the frame just below the level of the lower edge of the frame opening.

The device may be made of any desired size. Frames having the rectangular shape shown, and three feet or more in the longer dimension, have proven to be entirely practical and highly effective in fulfilling the contemplated display purposes.

It will be understood that may of the details herein described and illustrated are merely for purposes of exemplification, and that those skilled in the art will be enabled to make changes of various kinds without necessarily departing from the spirit and scope of the invention as expressed in the appended claims.

Having thus described my invention what I claim as new and desire to secure by Letters Patent is:

1. A display device comprising a frame having an opening and adapted to be supported in upstanding rearwardly inclined position on a supporting surface, a pad of light reflective sheets each smaller than the opening in said frame and positioned on said surface adjacent to and forwardly of said frame, binding means connecting said sheets together along one edge thereof and hingedly connecting said edge to said frame below said frame opening for individual unobstructed swinging movement of said sheets rearwardly through said frame opening to a position on said surface rearwardly of said frame, said sheets in their rearwardly swung position serving to reflect light toward said frame opening, and a light-permeable display leaf interposed between each adjacent pair of said sheets and connected by said binding means for individual rearward swinging movement toward said frame opening, said display leaves each being slightly larger than said frame opening so as to rest in upstanding position upon said frame and cover said opening when swung rearwardly toward the latter, each of said display leaves in its upstanding position receiving light from the previously rearwardly swung light reflective sheet, said display leaves each being sufficiently flexible to pass rearwardly under pressure through said frame opening to said position rearwardly of said frame.

2. A display device according to claim 1, in combination with a pair of facing, spaced wings extending rearwardly from said frame on opposite sides of said frame opening, the facing sides of said wings being reflective to direct additional light toward said frame opening.

3. A display device according to claim 1, wherein said sheets and leaves are loosely connected together by a ring binder to permit relatively flat stacked disposition of said sheets and leaves in said forward and rearward positions on said surface.

4. A display device according to claim 1, the rear face of each of said light reflective sheets being provided with indicia relating to the display indicia on the adjacent upper one of said display leaves.

5. A display device according to claim 1, said binding means being detachably secured to said frame to permit simultaneous removal of all of said sheets and leaves from said position rearwardly of said frame and replacement of said sheets and leaves in said position forwardly of said frame.

6. A display device according to claim 1, said binding means comprising a backing member detachably secured to said frame, and a plurality of rings carried by said backing member and extending through said sheets and leaves, said binding means thus permitting relatively flat stacked disposition of said sheets and leaves in said forward and rearward positions on said surface.

7. A display device according to claim 1, wherein said light-permeable leaves are of reduced lateral extent in the region adjacent to said binding means, whereby slight flexing of said light-permeable leaves remote from said binding means will suffice to effect movement of said light-permeable leaves through said frame opening.

References Cited in the file of this patent

UNITED STATES PATENTS

| | | |
|---|---|---|
| 428,423 | Snyder | May 20, 1890 |
| 630,717 | King | Aug. 8, 1899 |
| 764,136 | Leeland | July 5, 1904 |
| 2,382,556 | Falls | Aug. 14, 1945 |
| 2,654,173 | Christensen | Oct. 6, 1953 |

FOREIGN PATENTS

| | | |
|---|---|---|
| 695,538 | Germany | Aug. 27, 1940 |